2,857,310

QUINOLINIUM AND PYRIDINIUM QUATERNARIES

Samuel Allen Heininger, Dayton, Ohio, assignor to Monsanto Chemical Company, St. Louis, Mo., a corporation of Delaware No Drawing. Application April 9, 1956
Serial No. 576,796

10 Claims. (Cl. 167—33)

This invention relates to quaternary salts of aromatic N-heterocyclic tertiary amines wherein the fourth valence of the amino nitrogen atom is bonded to a 2-carbalkoxyethyl radical; to the preparation thereof; and to compositions and methods for the application of these quaternary salts as insecticides.

The presently provided compounds are of the formula:

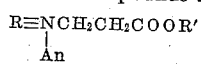

where An is the anion of a strong organic or inorgnaic acid; R' is a hydrocarbon radical free of non-benzenoid unsaturation containing from 4 to 18 carbon atoms, and R is the residue of an aromatic N-heterocyclic ring system free of non-benzenoid unsaturation and containing only hydrogen, nitrogen, and from 3 to 14 carbon atoms.

By non-benzenoid unsaturation is here meant carbon-to-carbon, olefinic or acetylenic unsaturation. By an aromatic N-heterocyclic ring system is here meant a monocyclic or fused polycyclic ring system containing a conjugated system of double bonds, wherein the ring skeleton consists of carbon atoms and at least one nitrogen atom.

The present quaternary salts are readily prepared by the reaction of an aromatic N-heterocyclic tertiary amine with a beta-substituted propionate ester derivative of the formula An—$CH_2CH_2COOR'$, as represented by the following equation:

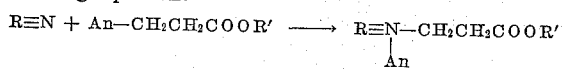

where R, R', and An are as defined hereinabove. The anion An in the above formula may be a halogen such as chlorine, bromine or iodine, a sulfonate radical such as $CH_3SO_3$—, $C_2H_5SO_3$—, or p—$CH_3C_6H_4SO_3$—, or an alkyl sulfate radical such as $CH_3SO_4$—, etc. The propionate ester derivatives of the formula An—$CH_2CH_2COOR'$, carrying anions of the above-listed types linked to the beta carbon atom, are readily prepared by addition of a hydrohalide, sulfonic acid, or alkyl sulfuric acid across the double bond of acrylic acid esters, for example.

In accordance with the present invention, the carboxylic acid radical of the beta-substituted propionic acid is esterified by a hydrocarbon radical free of non-benzenoid unsaturation, and containing from 4 to 18 carbon atoms. Particularly preferred in the present process are the alkyl propionate esters. As examples of beta-halopropionate alkyl esters of the above formula wherein the alkyl radical contains from 4 to 18 carbon atoms may be listed, for example, n-butyl β-chloropropionate, isobutyl β-chloropropionate, amyl β-chloropropionate, hexyl β-bromopropionate, 2-ethylhexyl β-chloropropionate, n-decyl β-chloropropionate, dodecyl β-chloropropionate, hexadecyl β-chloropropionate, octadecyl β-chloropropionate, etc. As examples of presently useful β-sulfonylpropionate alkyl esters may be listed isobutyl β-(p-toluenesulfonyl)propionate, amyl β-(p-toluenesulfonyl) propionate, nonly β-(o-toluenesulfonyl)-propionate, dodecyl β-(methanesulfonyl)propionate, tetradecyl β-(p-toluenesulfonyl)propionate, etc. A third class of alkyl beta-substituted propionates which may be used in the process of the invention to prepare quaternary salts are the sulfate esters, such as β-carbobutoxyethyl ethyl sulfate, β-carbohexoxyethyl ethyl sulfate, β-carbo-2-ethylhexoxyethyl methyl sulfate, β-carbononoxyethyl ethyl sulfate, β-carbotetradecoxyethyl ethyl sulfate, etc.

Other presently useful propionate esters of the above formula are, for example, cycloalkyl esters such as cyclohexyl β-chloropropionate, cyclohexyl β-(p-toluenesulfonyl)propionate, 2,5-dimethylcyclohexyl β-chloropropionate, etc.; aralkyl esters such as benzyl β-chloropropionate, phenethyl β-chloropropionate, cuminyl β-chloropionate, benzyl β-(p-toluenesulfonyl)propionate, 3-phenylpropyl β-chloropropionate, β-carbobenzoxyethyl ethyl sulfate, etc.; and aryl and alkaryl esters such as phenyl β-chloropropionate, p-tolyl β-chloropropionate, α-naphthyl β-chloropropionate, phenyl β-(p-toluenesulfonyl)propionate, p-dodecylphenyl β-chloropropionate, etc.

In accordance with the present invention, beta-substituted propionate esters are reacted with aromatic N-heterocyclic tertiary amines to produce quaternary salts. The aromatic N-heterocyclic tertiary amines which are presently useful contain only hydrogen, nitrogen, and from 4 to 14 carbon atoms and include mono- and polycyclic ring systems, unsubstituted or substituted by alkyl radicals. As examples of presently useful monocyclic tertiary amines containing one heterocyclic nitrogen atom may be listed, for example, pyridine and the methyl pyridines available, for example, from coal tar, i. e., 2-, 3-, and 4-picoline, the lutidines, the collidines, and mixtures thereof, as well as 4-ethylpyridine, 3-isopropylpyridine, 2,4,6-tripropylpyridine, 4-cyclohexylpyridine, etc. Bicyclic aromatic tertiary amine N-heterocyclic compounds which may be quaternized in accordance with the process of the invention include quinoline, lepidine, and quinaldine, isoquinoline, 1-methylisoquinoline, and 1,4-dimethylisoquinoline, 6-propylquinoline, etc. Typical of the tricyclic aromatic N-heterocyclic tertiary amines falling within the above-defined class of amines which are within the scope of the present reaction are benz[g]isoquinoline and acridine.

Among the heterocyclic tertiary amine compounds containing a plurality of nitrogen atoms which are useful in the present process for the production of the novel compounds of this invention may be listed the monocyclic N-heterocyclics such as pyridazine, pyrimidine, pyrazine, and sym-triazine; and polycyclic N-heterocyclics such as phthalazine, quinazoline, quinoxaline, 2-phenylquinoxaline, and phenazine, etc.

The products of the present reaction are quaternary salts, the nomenclature of which is governed by the amine from which the salts are prepared. For example, from pyridine and beta-substituted propionate alkyl esters there may be prepared 1-(2-carbobutoxethyl)pyridinium chloride, 1-(2-carboisobutoxyethyl)pyridinium chloride, 1-(2-carbobutoxyethyl)pyridinium p-toluenesulfonate, 1-(2-carbobutoxyethyl)pyridinium ethyl sulfate, 1-(2-carbamoxyethyl)pyridinium chloride, 1-(2-carbohexoxyethyl) pyridinium p-toluenesulfonate, 1-(2-carbo-2-ethylhexoxyethyl)pyridinium chloride, 1-(2-carbo-2-ethylhexoxy)-ethyl)pyridinium ethyl sulfate, 1-(2-carbononoxyethyl) pyridinium chloride, 1-(2-carbodecoxyethyl)pyridinium p-toluenesulfonate, 1-(2-carbododecoxyethyl)pyridinium p-toluenesulfonate, 1-(2-carbotridecoxyethyl)pyridinium p-toluenesulfonate, 1-(2-carbotetradecoxyethyl)pyridinium chloride, 1-(2-carbotetradecoxyethyl)pyridinium ethyl sulfate, 1-(2-carbohexadecoxyethyl)pyridinium chloride, 1-(2-carbooctadecoxyethyl)pyridinium p-toluenesulfonate, etc. From the methyl-substituted pyridines, similarly there may be prepared quaternary derivatives of picoline, such as 1-(2-carbobutoxyethyl)-2-picolinium chloride, 1-(2-carbobutoxyethyl)-3-picolinium p-toluenesulfonate, 1-(2-carboisobutoxyethyl)-3-picolinium ethyl sulfate, 1-(2-carbamoxyethyl)3-picolinium bromide, 1-(2-carboheptoxyethyl)-3-picolinium p-toluenesulfonate, 1-(2-carbododecoxyethyl)-4-picolinium p-toluenesulfonate, 1-(2-carbotetradecoxyethyl)-4-picolinium chloride, etc.; lutidine derivatives such as 1-(2-carbobutoxyethyl)-2,4-dimethylpyridinium chloride, 1-(2-carbooctoxyethyl)-3,5-dimethylpyridinium p-toluenesulfonate, 1-(2-carbododecoxyethyl)3,4-dimethylpyridinium chloride, etc.; and collidine derivatives such as 1-(2-carbobutoxyethyl)-2,4,6-trimethylpyridinium chloride, 1-(2-carbotetradecoxyethyl)-2,4,6-trimethylpyridinium p-toluenesulfonate, 1-(2-carboisodecoxyethyl)-3,4,5-trimethylpyridinium ethyl sulfate, etc. Pyridines containing longer chain alkyl substituents, on quaternization with the present beta-substituted propionate alkyl esters, may give, e. g., 1-(2-carbobutoxyethyl)-4-isopropylpyridinium chloride, 1-(2-carbamoxyethyl)-4-isohexylpyridinium p-toluenesulfonate, 1-(2-carbodecoxyethyl)-4-heptylpyridinium chloride, etc. From pyridines and alkyl-substituted pyridines reacted with esters of beta-substituted propionic acids wherein the ester group contains a cyclic structure, there may be obtained, for example, 1 - (2-carbocyclohexoxyethyl)pyridinium chloride, 1-(2-carbophenoxyethyl)pyridinium chloride, 1-(2-carbobenzoxyethyl)pyridinium chloride, 1-(2-carbonaphthoxyethyl)pyridinium chloride, 1-(2 - (carbo - 3-phenylpropoxy)ethyl)3,4-dimethylpyridinium p-toluenesulfonate, 1-(2-carbophenoxyethyl)-3,4,5-trimethylpyridinium p-toluenesulfonate, etc.

The quaternary salts prepared by the process of this invention also include those derived from the tertiary amine N-heterocyclic polycyclic ring systems. For example, from quinoline there may be prepared in accordance with the invention 1-(2-carbobutoxyethyl)quinolinium chloride, 1-(2-carbohexoxyethyl)quinolinium chloride, 1-(2-(carbo-2-ethylhexoxy)ethyl)quinolinium p-toluenesulfonate, 1-(2-carbotetradecoxyethyl)quinolinium chloride, 1-(2-carbooctadecoxyethyl)quinolinium ethyl sulfate, etc. The quaternization of isoquinoline with the present beta-substituted propionates affords, e. g., 2-(2-carbohexoxy)isoquinolinium chloride, 2 - (2 - (carbo-2-ethylhexoxy)ethyl)isoquinolinium p-toluenesulfonate, 2-(2-(carbo-3-phenylpropoxy)ethyl)isoquinolinium ethyl sulfate, etc. From quinaldine there may be prepared, for example, 1-(2-carbobutoxyethyl)quinaldinium chloride, 1-(2-carbamoxyethyl)quinaldinium p-toluenesulfonate, 1-(2-carbononoxyethyl)quinaldinium p-toluenesulfonate, 1-(2-carbotetradecoxyethyl)quinaldinium chloride, 1-(2-carbophenoxyethyl)quinaldinium p-toluenesulfonate, 1-(2-carbobenzoxyethyl)quinaldinium methanesulfonate, etc. Similarly, from lepidine there may be prepared 1-(2-carbobutoxyethyl)lepidinium chloride, 1-(2-carboisododecoxyethyl)lepidinium p-toluenesulfonate, 1-(2-carbo-3-phenylpropoxyethyl)lepidinium p-toluenesulfonate, 1-(2-carbocyclohexoxyethyl)lepidinium chloride, etc. Reaction of benzisoquinolines, tricyclic tertiary amines, with beta-substituted propionates by the process of the invention makes available, e. g., 2-(2-carbobutoxyethyl)benz[g]isoquinolinium chloride. Quinolines containing a plurality of methyl substituents or alkyl substituents of longer chain length than methyl and containing up to 14 carbon atoms may be quaternized by the procedure described herein to give such salts as 1-(2-carbobutoxyethyl)3,6-dimethylquinolinium chloride, 1-(2-carbohexoxyethyl)-6-ethylquinolinium chloride, 1 - (2 - (carbo-2,3-dimethylbutoxy)ethyl)-6-isopropylquinolinium chloride, 1-(2-carbotetradecoxyethyl)-6-ethyl-7-n-propylquinolinium chloride, 7-amyl-2-(2-carbobutoxyethyl)isoquinolinium p-toluenesulfonate, etc. Using N-heterocyclic aromatically unsaturated tertiary amines wherein a plurality of nitrogen atoms are present in the ring skeletons, there may be obtained in accordance with the invention, for example, N-(2-carboisobutoxyethyl)pyrazinium chloride, N-(2-carbophenoxyethyl)pyrimidinium p-toluenesulfonate, N-(2-carbododecoxyethyl)quinoxalinium chloride, etc.

In carrying out the present process, the N-heterocyclic tertiary amine is simply contacted with the beta-substituted propionate ester until reaction is complete. In carrying out this reaction, the propionate and the tertiary amine are preferably contacted in approximately equimolecular proportions, although an excess of the more readily available component may be used if desired. Preferably, the reaction mixture is heated to accelerate the formation of the quaternary salt; temperatures up to below the decomposition temperatures of the reaction components are suitable, and conveniently the reflux temperature of the reaction mixture may be used. It is sometimes convenient to carry out the reaction in the presence of inert solvents and diluents; suitable solvents are, for example, hydrocarbons such as benzene and hexane, and oxy compounds such as ethanol or dioxane, etc. The time required to complete the reaction varies widely, and may be extended as necessary to obtain satisfactory yields, longer reaction times being required, for example, with sterically hindered amines such as 2-picoline, to produce the desired product. The quaternary salt may be isolated by cooling the reaction mixture and collecting the product which separates; distilling the reaction mixture to remove solvent and unreacted starting materials; or adding to the reaction mixture a liquid, such as ether, which is a non-solvent for the quaternary, and which causes the separation thereof, etc.

The quaternary salts prepared in the manner described above can be converted by the usual methods to corresponding quaternary hydroxide salts, for example, by reaction of the sulfonate, chloride, or sulfate salts with barium hydroxide, or by treatment of the salts with an anion exchanger. Other anions, similarly, may be substituted for the original propionate beta substituent by means known to those skilled in the art.

The products obtainable in accordance with this invention are generally stable compounds which range from viscous liquids and gels to waxy solids. They are mostly soluble in water and in ethanol and insoluble in ether. The present novel compounds are useful for a variety of agricultural and chemical purposes. For example, products having long alkyl ester chains on the carboxylate radical, the ester group containing from 12 to 18 carbon atoms, are particularly useful as surface-active agents. When the ester radical contains from 6 to 10 carbon atoms and is branched, the present products exhibit herbicidal properties. The quaternaries derived from monocyclic N-heterocyclic amines may be particularly useful, for example, for pharmaceutical applications, e. g., in the suppression of bacteria such as *M. tuberculosis* or for treatment of infections caused by protozoa of the genus Trypanosoma. The products of this invention are generally biological toxicants and may be applied, for example, as fungicides, bactericides, nematocides, etc. The present esters are of especial utility as insecticides.

The invention is illustrated, but not limited, by the following examples:

Example 1

A mixture of 23.7 g. (0.3 mole) of pyridine, 49.5 g. (0.3 mole) of n-butyl β-chloropropionate, and 100 ml. of ethanol was refluxed for 72 hours in a flask provided with a condenser protected by a drying tube. The reaction mixture was then heated at 65° C. under a vacuum of approximately 0.25 mm. for two hours, to remove solvent and unreacted starting materials. The residue was washed twice with a total of 400 ml. of anhydrous ether, after which the ether was decanted and the product warmed at 40° C. under vacuum overnight. There were obtained 57.5 g. of 1-(2-carbobutoxyethyl)-pyridinium chloride, a thick, viscous, hygroscopic liquid, containing 14.94% chlorine (calculated for $C_{12}H_{18}ClNO_2$, 14.6% Cl).

Example 2

Using the procedure of Example 1, by the reaction of 44.8 g. (0.5 mole) of pyridine and 110.4 g. (0.5 mole) of 2-ethyl-hexyl β-chloropropionate in 150 ml. of absolute ethanol, there was obtained 1-(2-(carbo-2-ethylhexoxy)ethyl)pyridinium chloride, a yellow viscous liquid, analyzing as follows:

|  | Found | Calculated for $C_{16}H_{26}ClNO_2$ |
| --- | --- | --- |
| Percent C | 62.53 | 64.1 |
| Percent H | 8.79 | 8.74 |
| Percent N | 4.70 | 4.66 |
| Percent Cl | 12.61 | 11.8 |

Similarly, by refluxing 4-picoline with 2-ethylhexyl β-chloropropionate in ethanol, washing with ether, and drying, 1-(2-(carbo-2-ethylhexoxy)ethyl) - 4 - picolinium chloride is obtained.

Example 3

A mixture of 16 g. of pyridine with 47 g. (0.2 mole) of nonyl β-chloropropionate in 100 ml. of absolute ethanol was refluxed for a total of 72 hours. The temperature rose during this time to 90° C. The ethanol was distilled off under vacuum and the product washed with ether as described above, leaving 1-(2-carbononoxyethyl)pyridinium chloride, a white, viscous, hygroscopic liquid, which slowly hardened to a tan, waxy solid. The product weight was 44 g. after drying. Elemental analysis indicated the salt to contain 4.51% nitrogen and 12.45% chlorine (theor. for $C_{17}H_{28}ClNO_2$: 4.61% N, 11.7% Cl).

Similarly, by the reaction of benz[g]isoquinoline and the ester of β-chloropropionic acid with a branched chain nonyl alcohol, there is obtained 2-(2-carbononoxyethyl)benz[g]isoquinolinium chloride.

Example 4

A mixture of 145 g. (0.5 mole) of tridecyl β-chloropropionate with 39.5 g. (0.5 mole) of pyridine in 200 ml. of ethanol was refluxed for 90 hours. After removal of the ethanol under vacuum, the product was mixed with ether, in which it dissolved. Water was added, the mixture was allowed to stratify, and the aqueous solution was decanted from the ether and heated under vacuum. After removal of all the water, the salt was dissolved in ethanol and the solution evaporated to dryness at below 50° C., under an 0.2–1.0 mm. vacuum. Seventy-seven grams of product were obtained in the form of a gel, soluble in water, to give a solution which foamed on shaking. The product, 1-(2-carbotridecoxyethyl)-pyridinium chloride, was obtained as a hygroscopic gel containing 10.25% ionic chlorine (theor. 9.6% chlorine).

Using a procedure as described above, by the reaction of benzyl β-(p-toluenesulfonyl)propionate with quinoxaline, there is obtained 1-(2-carbobenzoxyethyl)quinoxalinium p-toluenesulfonate.

Example 5

To 32 g. (0.25 mole) of quinoline in 200 ml. of ethanol were added 54 g. (0.25 mole) of 2-ethylhexyl β-chloropropionate, and the mixture was refluxed for 69 hours. The alcohol solvent was stripped off under vacuum, and the remaining red liquid reaction product was poured into ether, whereupon a red-brown oil separated. The ether layer was decanted and the oil washed again with fresh ether, after which, on cooling, the colored oil formed a soft solid mass. Removal of ether under vacuum left a brown, semi-solid material, infrared analysis of which showed the presence of an ester configuration, the presence of aliphatic carbon-hydrogen bonds, and features indicative of the quinoline nucleus, thus identifying the product as the desired 1-(2-(carbo-2-ethylhexoxy)-ethyl) quinolinium chloride.

Isoquinoline is less sterically hindered than quinoline, and may readily be reacted with, for example, tridecyl β-chloropropionate to form 2-(2-carbotridecoxyethyl)isoquinolinium chloride.

Example 6

This example illustrates the utilization of 1-(2-carbobutoxyethyl)pyridinium chloride as an insecticide.

An emulsion of the quaternary salt prepared as described in Example 1 was made by mixing 1-(2-carbobutoxyethyl)pyridinium chloride with an equal amount by weight of "Emulsifier L" (reputed to be a mixture of a polyalkylene glycol derivative and an alkylbenzenesulfonate) and diluting the mixture with water to form an emulsion containing 0.2% of the quaternary salt. The foliage of a potted bean plant was dipped in this emulsion and allowed to stand and dry for one day, after which five second-instar larvae of the Mexican bean beetle (*Epilachna varivestis*) were placed on the leaves. Two days later, the plant was examined, and it was found that a 100% kill of the larvae had been produced.

Example 7

It has surprisingly been found that the corresponding carbethoxyethyl ester is not effective as an insecticide, in comparison to the carbobutoxyethyl compound of the previous example. This example illustrates the comparative insecticidal activities of the ethyl and butyl esters of the present quaternary salts.

1-(2-carbethoxyethyl)pyridinium chloride was prepared by a procedure similar to that described in Example 1. The quaternary salt is a waxy, light tan solid, soluble in water and in ethanol.

An acetone solution of the 1-(2-carbethoxyethyl)-pyridinium chloride was prepared by dissolving the compound in acetone to make 70 ml. of a 1% solution. A single drop, comprising approximately 0.0017 cc., of this acetone solution was applied to the dorsum of the thorax of each of five fifth-instar large milkweed bug nymphs (*Oncopeltus fasciatus*). Similarly, a 1% solution of the 1-(2-carbobutoxyethyl) pyridinium chloride of Example 1 was applied to milkweed bug nymphs. The nymphs were then released within observation dishes and held 24 hours at constant temperature. At the end of that time, it was found that, whereas all of the milkweed bugs to which the carbethoxyethyl-pyridinium chloride solution had been applied were alive, the 1-(2-carbobutoxyethyl) pyridinium chloride had produced a kill.

Example 8

This example provides additional comparisons of the toxicities of the ethyl and butyl esters of the present quaternary salts.

Emulsions containing an 0.2% concentration of the active chemical were prepared by mixing 1-(2-carbobutoxyethyl)pyridinium chloride and 1-(2-carbethoxyethyl)pyridinium chloride, respectively, with equal amounts of "Emulsifier L" and then adding water. Then bean plants which had previously been infested with the two-spotted spider mite (*Tetranychus bimaculatus*) were dipped in the two emulsions. After the plants had been held at constant temperature for three days, they were removed for observation. It was found that, whereas the carbobutoxyethylpyridinium salt gave a good kill of the adult mites, the toxic effect of the 1-(2-carbethoxyethyl) pyridinium chloride on the mite adults was only slight; furthermore, whereas the 1-(2-carbobutoxyethyl)pyridinium chloride salt exhibited residual toxicity against the resting stages of the mites, the 1-(2-carbethoxyethyl)pyridinium chloride gave no evidence of possessing residual toxicity against this species.

Similarly, acetone solutions of the ethyl and butyl esters were respectively applied to sheets of filter paper, which were then dried. On each sheet of the filter paper, there were confined ten red flour beetle (*Tribolium castaneum*) adults. After 24 hours, observation showed that while the butyl ester possessed a toxic effect on the red flour beetles, all of the beetles exposed to the deposit of the ethyl ester were still alive.

In another test, bean plants were cut and placed in solutions containing 0.004% of the ethyl and butyl esters, respectively, and held for three days. The cut plants were then transferred to water and infested with two-spotted spider mites, after which the plants were held at constant temperature and later observed. It was found that, whereas the butyl ester had a toxic effect on the mites, the ethyl ester was without activity.

*Example 9*

This example illustrates the insecticidal activity of the higher esters of the present quaternary salts.

Acetone solutions containing 1% concentrations of the salts were prepared respectively from the quaternary salts made as described in Examples 2 to 4, i. e., 1-(2-(carbo-2-ethylhexoxy)-ethyl)pyridinium chloride, 1-(2-carbononoxyethyl)pyridinium chloride, and 1-(2-carbotridecoxyethyl)pyridinium chloride. These solutions were applied to fifth instar large milkweed bug nymphs, as described in Example 6. All of the three esters were found to exhibit toxic effects in this test.

In another test, emulsions were prepared containing 0.2% concentrations of the products of Examples 2, 3, and 4, "Emulsifier L" being used as the emulsifying agent. Bean plants previously infested with the two-spotted spider mite were dipped in these emulsions and held for observation. Kill of the mite adults was obtained in each instance.

Immersion of the cut stem of a bean plant in an 0.004% concentration emulsion of 1-(2-carbotridecoxyethyl)-pyridinium chloride for three days and subsequent infestation of a plant leaf by the Mexican bean beetle larvae produced a 50% kill of this species.

Other compounds prepared in accordance with the process of the invention which may be used as insecticides include 2-(2-carbobutoxyethyl)isoquinolinium chloride, 1-(2-carbophenoxyethyl)-3-picolinium hydroxide, 1-(2-carbamoxyethyl)quinoxalinium methanesulfonate, etc.

The present compounds may be applied for the control of insects by spraying dilute emulsions of the salts onto the fruit or foliage of plants or other potential hosts in advance of an anticipated infestation, or by directly spraying the insects. The concentrations of active toxicant which need be used to produce insecticidal effects will vary depending on the severity of the infection, the choice of toxicant, the species infesting the plants, etc. The present compounds are water-soluble and may be applied directly as aqueous solutions; advantageously, they may be applied, for example, to crops as a solution in irrigation water. Other suitable formulations comprise dusts, wherein the active salt is diluted by an inert carrier such as talc. Emulsions of these toxicants, prepared as described above, are highly suitable compositions for their applications; the compositions incorporating the present insecticides may also, if desired, include other active pesticides such as fungicides, etc.

While the invention has been described with particular reference to specific embodiments thereof, it will be recognized that other variations and modifications are within the capabilities of those skilled in the art.

What is claimed is:

1. Quaternary salts selected from the class consisting of compounds of the formulas

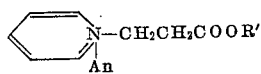

and

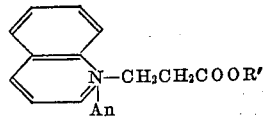

where R' is an alkyl radical containing from 4 to 18 carbon atoms and An is an anion selected from the class consisting of chlorine and bromine.

2. Quinolinium quaternary salts of the formula

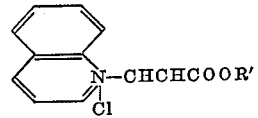

where R' is an alkyl radical and containing from 4 to 18 carbon atoms.

3. Pyridinium quaternary salts of the formula

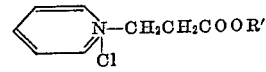

where R' is an alkyl radical and containing from 4 to 18 carbon atoms.

4. An insecticidal composition comprising an inert carrier and, as the essential effective ingredient, a quaternary salt selected from the class consisting of compounds of the formulas

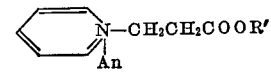

and

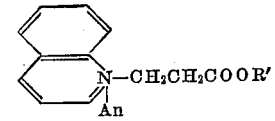

where R' is an alkyl radical containing from 4 to 18 carbon atoms, and An is an anion selected from the class consisting of chlorine and bromine.

5. 1-(2-carbobutoxyethyl)pyridinium chloride.
6. 1 - (2 - (carbo - 2 - ethylhexoxy)ethyl)pyridinium chloride.
7. 1-(2-carbononoxyethyl)pyridinium chloride.
8. 1 - (2 - carbotridecoxyethyl)pyridinium chloride.
9. 1 - (2 - (carbo - 2 - ethylhexoxy)ethyl)quinolinium chloride.
10. The method of killing insects which comprises contacting said insects with a lethal concentration of a quaternary salt selected from the class consisting of compounds of the formulas

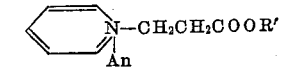

and

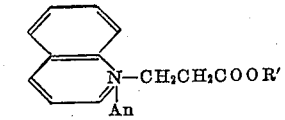

where R' is an alkyl radical containing from 4 to 18 carbon atoms, and An is an anion selected from the class consisting of chlorine and bromine.

References Cited in the file of this patent

UNITED STATES PATENTS

| | | |
|---|---|---|
| 2,023,075 | Harris | Dec. 3, 1935 |
| 2,202,328 | Albrecht | May 28, 1940 |
| 2,446,792 | Shelton et al. | Aug. 10, 1948 |